(12) United States Patent
Kato et al.

(10) Patent No.: US 7,649,287 B2
(45) Date of Patent: Jan. 19, 2010

(54) MOTOR FASTENING MECHANISM AND CAM DEVICE

(75) Inventors: Heizaburo Kato, Shizuoka (JP); Hideki Hotaka, Shizuoka (JP)

(73) Assignee: Sankyo Seisakusho Co. (Joint-stock company of Japan), Tokyo (JP)

( * ) Notice: Subject to any disclaimer, the term of this patent is extended or adjusted under 35 U.S.C. 154(b) by 530 days.

(21) Appl. No.: 11/520,309

(22) Filed: Sep. 12, 2006

(65) Prior Publication Data
US 2007/0063605 A1    Mar. 22, 2007

(30) Foreign Application Priority Data
Sep. 12, 2005  (JP) .............................. 2005-264195

(51) Int. Cl.
*H02K 7/10* (2006.01)
*B65G 27/02* (2006.01)

(52) U.S. Cl. ..................................... 310/75 R; 198/757
(58) Field of Classification Search ................ 248/671; 254/343; 198/757
See application file for complete search history.

(56) References Cited

U.S. PATENT DOCUMENTS

| 4,688,660 | A  | * | 8/1987 | Kaneko ....................... 254/343 |
| 6,021,992 | A  |   | 2/2000 | Yen et al. |
| 2005/0081938 | A1 | * | 4/2005 | Krumm ....................... 139/25 |
| 2006/0108205 | A1 | * | 5/2006 | Kato et al. .................. 198/757 |

FOREIGN PATENT DOCUMENTS

| DE | 102 00 328 A 1 | 7/2003 |
| JP | 2001341011 A   | 12/2001 |
| JP | 2001341011 A * | 12/2001 |
| JP | 2004-98789     | 4/2004 |
| JP | 2004-199828    | 7/2004 |

OTHER PUBLICATIONS

Machine Translation JP2004098789A and JP2001341011A.*
Extended European Search Report dated Jan. 2, 2007.
European Examination Report issued Jul. 6, 2007 for European Patent Application No. 06120418.6.
Chinese Office Action (with English translation) dated Sep. 19, 2008.
Second Chinese Office Action (with English translation) dated May 6, 2009.
Taiwan IPO Search Report No. 095133078 dated Aug. 5, 2009. (5 pages).

* cited by examiner

*Primary Examiner*—Quyen Leung
*Assistant Examiner*—Jose A Gonzalez Quinones
(74) *Attorney, Agent, or Firm*—Nutter McClennan & Fish LLP; John J. Penny, Jr.; Rory P. Pheiffer

(57) ABSTRACT

A motor-fastening mechanism fastens an output shaft of a motor and an input shaft of a driven member to each other. The motor-fastening mechanism has a fastening section which fastens the output shaft of the motor and the input shaft of the driven member relatively immovably, a motor-attachment member which is attached to the motor, an engaged section which is provided on either one of the motor-attachment member and the driven member, and an engaging section which is provided on the other of the motor-attachment member and the driven member and which is engaged to the engaged section such that displacement of the output shaft in a rotating direction thereof is regulated.

7 Claims, 15 Drawing Sheets

MOTOR FASTENING MECHANISM AND CAM DEVICE

CROSS-REFERENCE TO RELATED APPLICATIONS

The present application claims priority from Japanese Patent Application No. 2005-264195 filed on Sep. 12, 2005, which is herein incorporated by reference.

BACKGROUND

1. Technical Field

The present invention relates to a motor-fastening mechanism and a cam device.

2. Related Art

Regarding a method for fastening to an input shaft of a driven member an output shaft of a motor which rotates with high precision such as a servo motor, what is conventionally adopted is a method for fastening an output shaft to an input shaft by a coupling. If an output shaft is fastened to an input shaft by a coupling, it is necessary to absorb misalignment such as a parallel error, an angle error, and an axial error which occur on a fastened portion where the output shaft and the input shaft are fastened to each other. Therefore, an elastic coupling such as a rubber resin coupling, a bellows coupling, a metal coil spring coupling, and a metal plate spring coupling is used, and such misalignment is absorbed by elastic deformation of the elastic coupling (see "Coupling", Kikai Sekkei (Mechanical Design), Jan. 1, 1997, vol. 41, no. 1, p. 60-64).

The above-mentioned elastic coupling is effective in absorbing misalignment. However, since misalignment is absorbed by elastic deformation of the elastic coupling, transfer stiffness deteriorates and an angle of rotation of a motor is absorbed. As a result thereof, a runout error occurs. Further, it causes a problem that misalignment tends to occur.

SUMMARY

The present invention has been made in view of the above and other issues. An advantage of some aspects of the invention is to provide a motor-fastening mechanism and a cam device which can suppress remarkably the occurrence of lost motion such as a runout error by absorbing misalignment under a condition in which high transfer stiffness is maintained.

An aspect of the present invention for solving the above-mentioned problems is a motor-fastening mechanism for fastening an output shaft of a motor and an input shaft of a driven member to each other, including: a fastening section which fastens the output shaft of the motor and the input shaft of the driven member relatively immovably; a motor-attachment member which is attached to the motor; an engaged section which is provided on either one of the motor-attachment member and the driven member; and an engaging section which is provided on the other of the motor-attachment member and the driven member and which is engaged to the engaged section such that displacement of the output shaft in a rotating direction thereof is regulated.

Another aspect of the present invention is a cam device, including: a housing; a turret provided rotatably within the housing; a roller gear cam which is provided rotatably within the housing and which meshes with the turret mutually; and a motor whose output shaft is fastened to an input shaft of the roller gear cam by a motor-fastening mechanism, the motor-fastening mechanism having a fastening section which fastens the output shaft of the motor and the input shaft of the roller gear cam relatively immovably, a motor-attachment member which is attached to the motor, an engaged section which is provided on either one of the motor-attachment member and the housing, and an engaging section which is provided on the other of the motor-attachment member and the housing and which is engaged to the engaged section such that displacement of the output shaft in a rotating direction thereof is regulated.

Other features of the present invention are described in the specification and the drawings.

DESCRIPTION OF EXEMPLARY EMBODIMENTS

Figure 1:
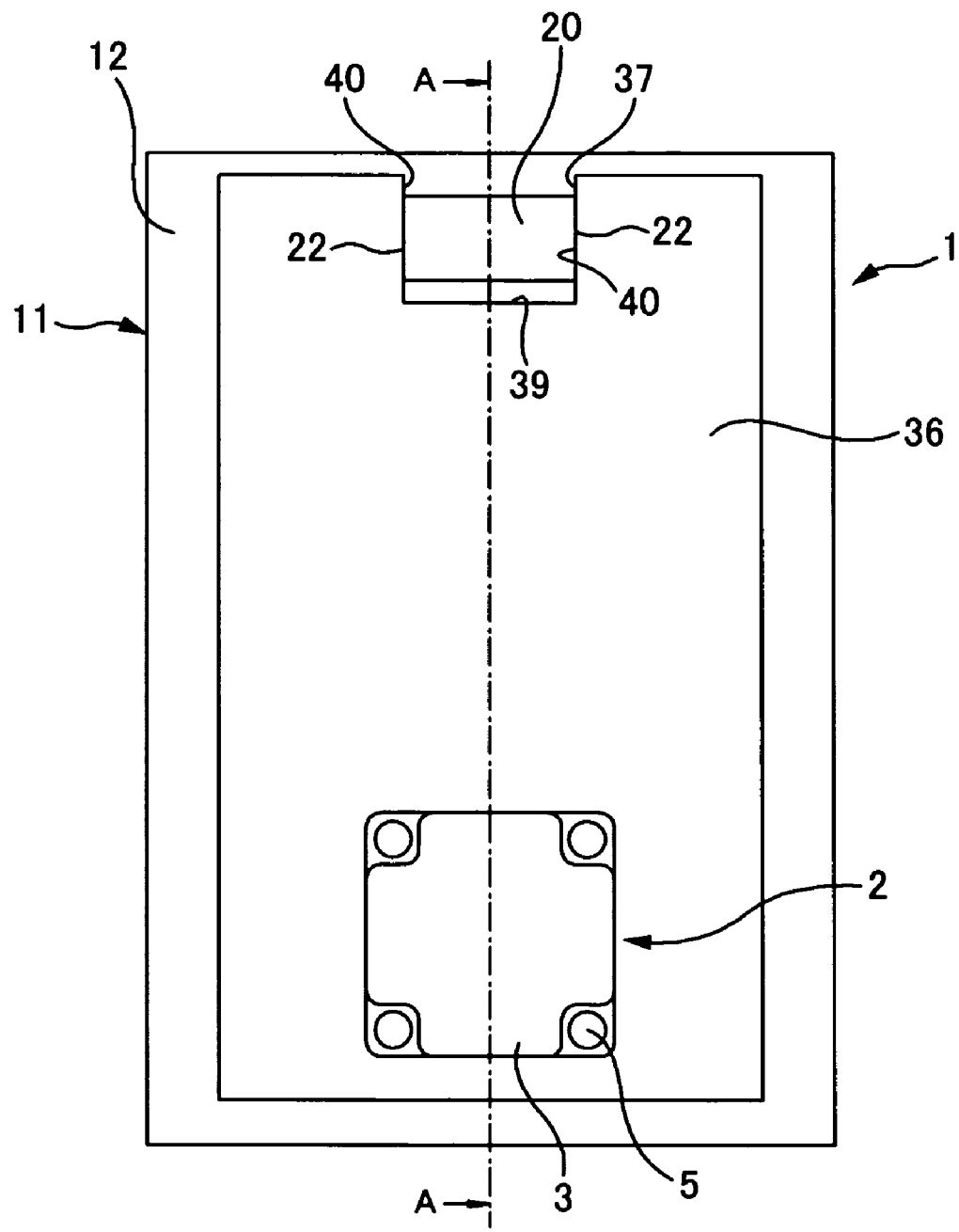
FIG. 1 is a front view showing a first embodiment of a motor-fastening mechanism according to the present invention.

An aspect of the present invention is a motor-fastening mechanism for fastening an output shaft of a motor and an input shaft of a driven member to each other, including: a fastening section which fastens the output shaft of the motor and the input shaft of the driven member relatively immovably; a motor-attachment member which is attached to the motor; an engaged section which is provided on either one of the motor-attachment member and the driven member; and an engaging section which is provided on the other of the motor-attachment member and the driven member and which is engaged to the engaged section such that displacement of the output shaft in a rotating direction thereof is regulated.

Such a motor-fastening mechanism enables to obtain high transfer stiffness because the fastening section can fasten the output shaft of the motor and the input shaft of the driven member to each other relatively immovably. Further, misalignment occurring on a fastened portion where the output shaft and the input shaft are fastened together is absorbed since the engaged section provided on either one of the motor-attachment member or the driven member and the engaging section provided on the other of the motor-attachment member or the driven member are engaged to each other such that displacement of the output shaft in its rotating direction is regulated.

Further, in the above-mentioned motor-fastening mechanism, it is preferable that either one of a contact surface of the engaging section which is in contact with the engaged section and a contact surface of the engaged section which is in contact with the engaging section is formed into a curved surface having a radius of curvature which depends on misalignment occurring on a fastened portion where the output shaft of the motor and the input shaft of the driven member are fastened to each other; and the other of the contact surface of the engaging section which is in contact with the engaged section and the contact surface of the engaged section which is in contact with the engaging section is formed as a flat surface.

Such a motor-fastening mechanism enables to absorb misalignment occurring on the fastened portion where the output shaft and the input shaft are fastened together since the engaged section provided on either one of the motor-attachment member or the driven member and the engaging section provided on the other of the motor-attachment member or the driven member are engaged to each other such that displacement of the output shaft in its rotating direction is regulated.

In this case, either one of the contact surface of the engaging section which is in contact with the engaged section or the contact surface of the engaged section which is in contact with the engaging section is formed into a curved surface having a radius of curvature that depends on misalignment occurring on the fastened portion where the output shaft of the motor and the input shaft of the driven member are fastened together, and the other of the contact surface of the engaging section which is in contact with the engaged section or the contact surface of the engaged section which is in contact with the engaging section is formed as a flat surface. Such a configuration enables to absorb misalignment under a condition in which high transfer stiffness is maintained.

Further, in the above-mentioned motor-fastening mechanism, it is preferable that the one of either the contact surface of the engaging section which is in contact with the engaged section and the contact surface of the engaged section which is in contact with the engaging section which is to be formed into a curved surface is formed such that the curved surface has a radius of curvature which depends on the misalignment and is curved in a direction along an axis of the output shaft of the motor and in a direction perpendicular to the axis.

Such a motor-fastening mechanism enables to allow displacement of the engaging section in the tangential direction of the curved surface within the engaged section and enables to restrict displacement in a normal direction of the curved surface. Accordingly, it becomes possible to absorb reliably misalignment occurring on the fastened portion where the output shaft of the motor and the input shaft of the driven member are fastened together.

Further, in the above-mentioned motor-fastening mechanism, it is preferable that when a radius of curvature of the curved surface of the engaging section is defined as R1 and a radius of curvature of a circle inscribed in the engaged section is defined as R2, a radius of curvature of the curved surface of either of the engaging section and the engaged section is set such that the relationship R1>>R2 is satisfied.

Such a motor-fastening mechanism enables to obtain high transfer stiffness because the radius of curvature of the curved surface of the engaging section can be maximized and therefore deformation caused by stress can be reduced remarkably when verification is made regarding contact stress, for example.

Further, in the above-mentioned motor-fastening mechanism, it is preferable that a clearance is provided between the engaging section and the engaged section, the clearance depending on misalignment occurring on a fastened portion where the output shaft of the motor and the input shaft of the driven member are fastened to each other.

Such a motor-fastening mechanism enables to reduce occurrence of lost motion remarkably because the clearance between the engaging section and the engaged section can be minimized.

Further, in the above-mentioned motor-fastening mechanism, it is preferable that the engaging section is constructed of an elastic member which is elastically deformable depending on misalignment occurring on a fastened portion where the output shaft of the motor and the input shaft of the driven member are fastened to each other.

Such a motor-fastening mechanism enables to reduce occurrence of lost motion remarkably because the engaging section can be constructed of a member which is made from polymeric material, etc. and has rigidity and the minimum elasticity.

Further, in the above-mentioned motor-fastening mechanism, it is preferable that the input shaft and the output shaft are fastened to each other by frictionally fastening the output shaft of the motor and a fitting hole which is provided coaxially with the output shaft of the motor in an end section of the input shaft, the frictional fastening being achieved by fitting the output shaft of the motor into the fitting hole.

Such a motor-fastening mechanism enables to reduce remarkably misalignment occurring on the fastened portion where the output shaft and the input shaft are fastened together.

Another aspect of the present invention is a cam device, including: a housing; a turret provided rotatably within the housing; a roller gear cam which is provided rotatably within the housing and which meshes with the turret mutually; and a motor whose output shaft is fastened to an input shaft of the roller gear cam by a motor-fastening mechanism, the motor-fastening mechanism having a fastening section which fastens the output shaft of the motor and the input shaft of the roller gear cam relatively immovably, a motor-attachment member which is attached to the motor, an engaged section which is provided on either one of the motor-attachment member and the housing, and an engaging section which is provided on the other of the motor-attachment member and the housing and which is engaged to the engaged section such that displacement of the output shaft in a rotating direction thereof is regulated.

Such a cam device enables to obtain high transfer stiffness because the output shaft of the motor and the input shaft of the roller gear cam are fastened to each other relatively immovably by the fastening section. Further, misalignment occurring on a fastened portion where the output shaft and the input shaft are fastened together is absorbed since the engaged section provided on either one of the motor-attachment member or the roller gear cam and the engaging section provided on the other of the motor-attachment member or the roller gear cam are engaged to each other such that displacement of the output shaft in its rotating direction is regulated.

As described above, such a motor-fastening mechanism enables to obtain high transfer stiffness because the output shaft of the motor and the input shaft of the driven member are fastened to each other relatively immovably by the fastening section. Further, misalignment occurring on the fastened portion where the output shaft of the motor and the input shaft of the driven member are fastened together is absorbed since the engaged section provided on either one of the motor-attachment member or the driven member and the engaging section provided on the other of the motor-attachment member or the driven member are engaged to each other such that displacement of the output shaft in its rotating direction is regulated. Therefore, misalignment occurring on the fastened portion where the output shaft and the input shaft are fastened together can be absorbed under a condition in which high transfer stiffness is maintained. Accordingly, it is possible to transfer rotation without backlash and with high rigidity and almost no lost motion such as a runout error.

Furthermore, since the radius of curvature of the curved surface of the engaging section can be maximized, it is possible to reduce deformation caused by stress remarkably and to obtain high transfer stiffness when verification is made regarding contact stress, for example.

Furthermore, this enables to reduce remarkably misalignment occurring on the fastened portion where the output shaft of the motor and the input shaft of the driven member are fastened together.

Furthermore, such a cam device enables to obtain high transfer stiffness because the output shaft of the motor and the input shaft of the roller gear cam are fastened to each other relatively immovably by the fastening section.

Further, misalignment occurring on the fastened portion where the output shaft of the motor and the input shaft of the roller gear cam are fastened together is absorbed since the engaged section provided on either one of the motor-attachment member or the roller gear and the engaging section provided on the other of the motor-attachment member or the roller gear cam are engaged to each other such that displacement of the output shaft in its rotating direction is regulated. Therefore, misalignment occurring on the fastened portion where the output shaft and the input shaft are fastened together can be absorbed under a condition in which high transfer stiffness is maintained. Accordingly, it is possible to transfer rotation without backlash and with high rigidity and almost no lost motion such as a runout error.

This section below describes an embodiment of the present invention illustrated in the drawings.

Figure 2:
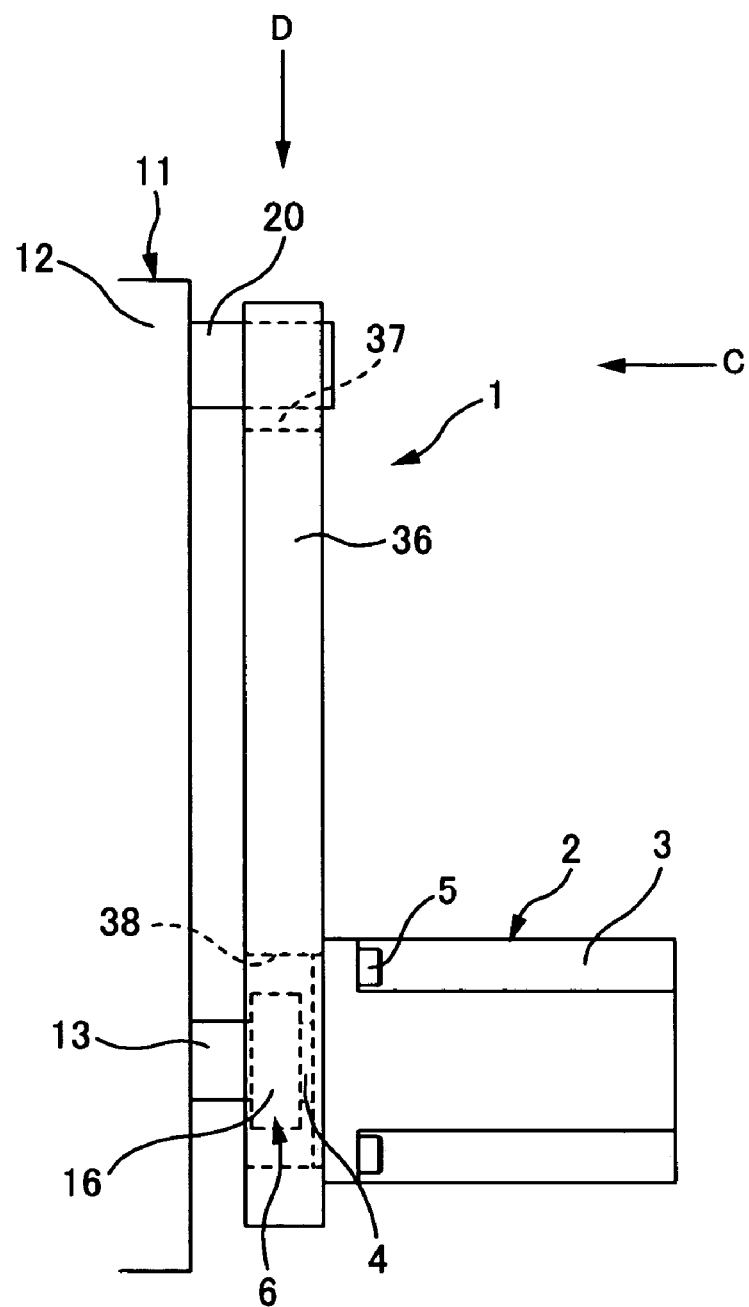
FIG. 2 is a side view of FIG. 1.
Figure 3:
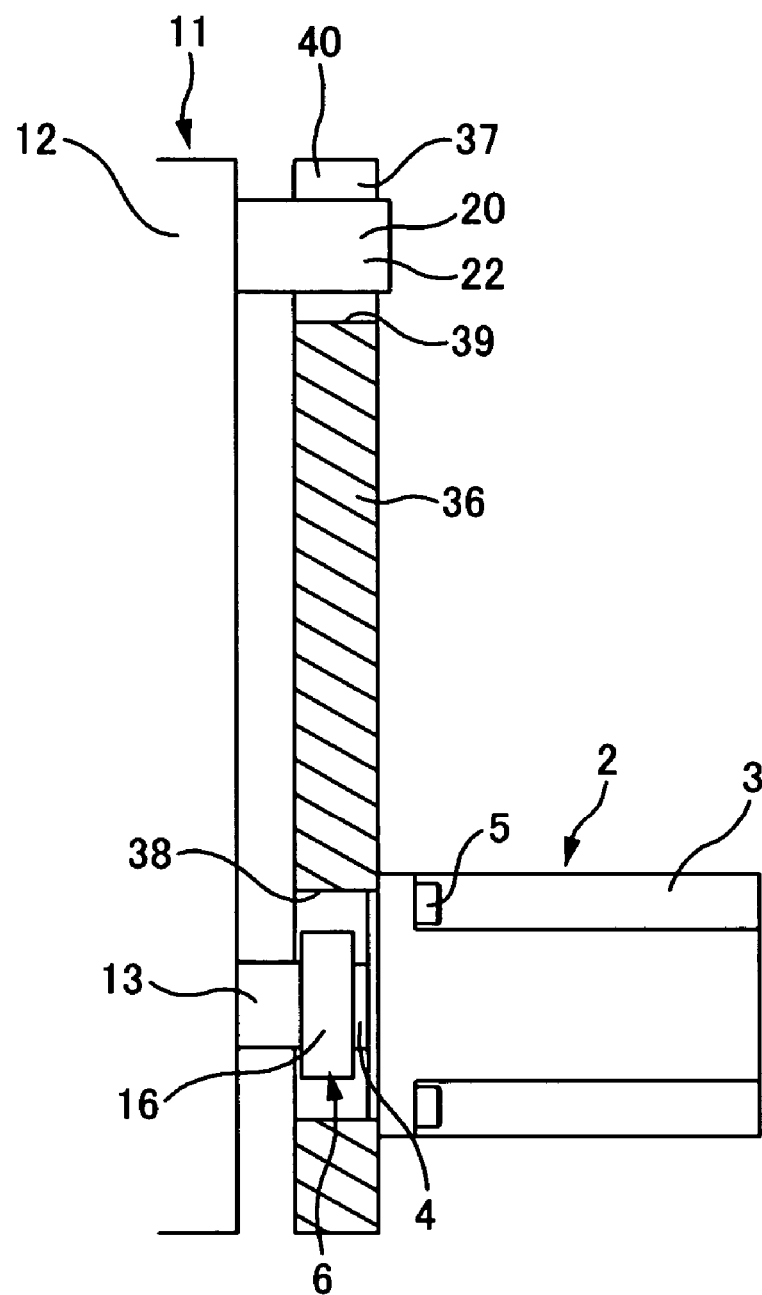
FIG. 3 is a cross-sectional view along section A-A of FIG. 1.
Figure 4:
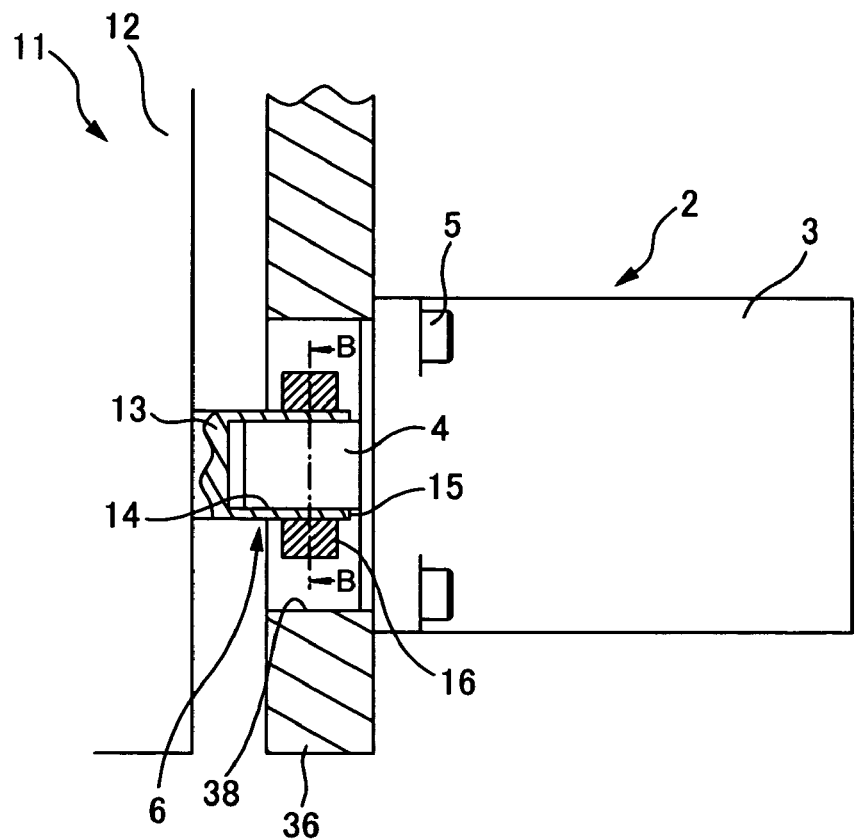
FIG. 4 is a magnified cross-sectional view of a part of FIG. 3.
Figure 5:
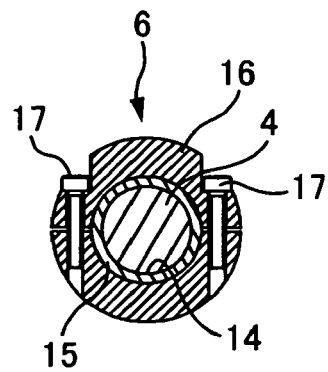
FIG. 5 is a cross-sectional view along section B-B of FIG. 4.
Figure 6:
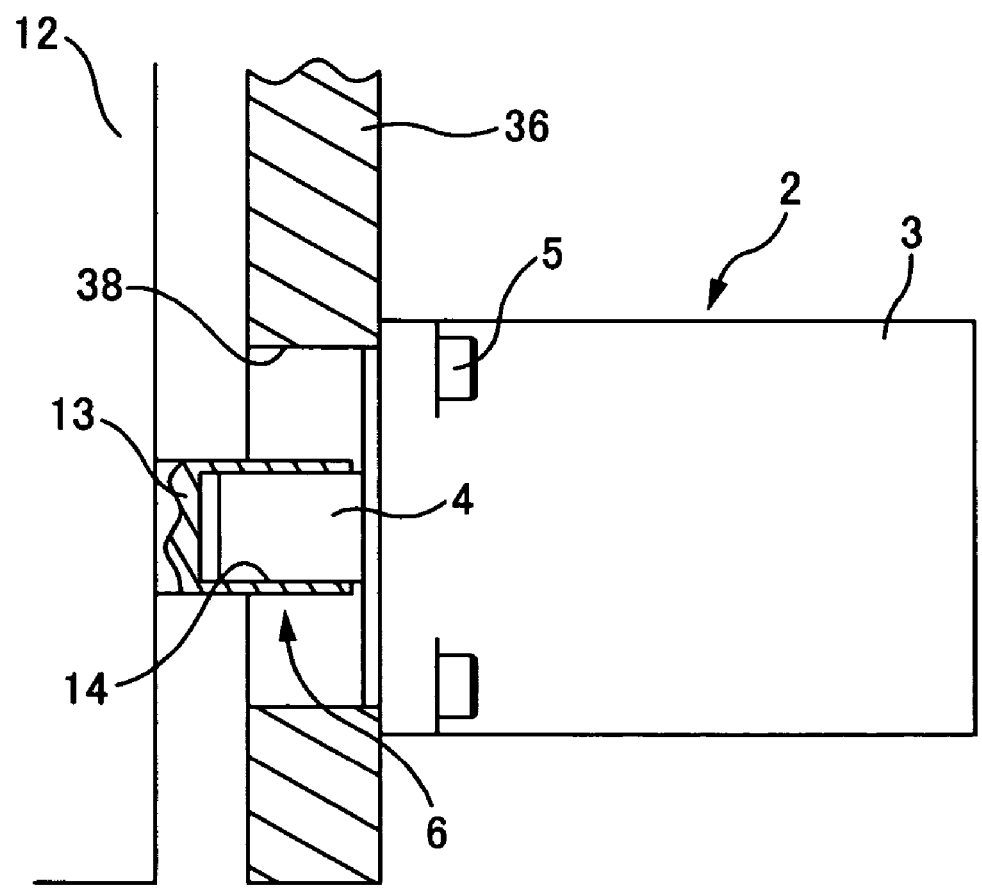
FIG. 6 is a magnified cross-sectional view showing another example of a fastening section.
Figure 7:
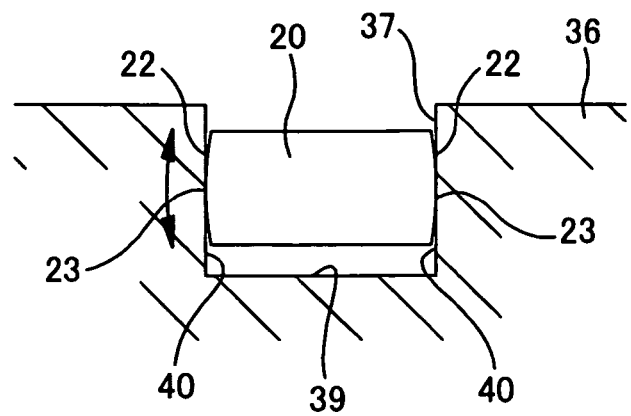
FIG. 7 is a view on arrow C of FIG. 2.
Figure 8:
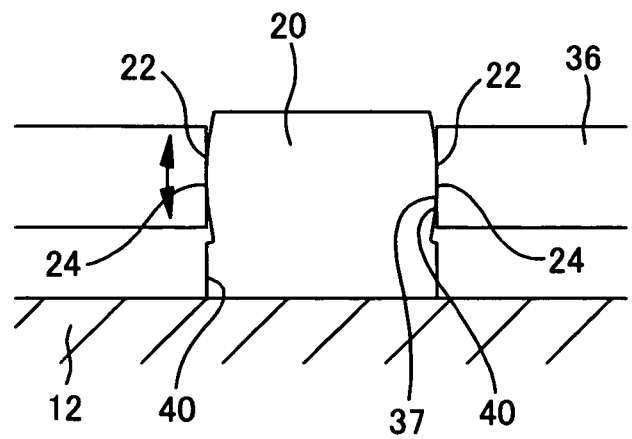
FIG. 8 is a view on arrow D of FIG. 2.
Figure 9:
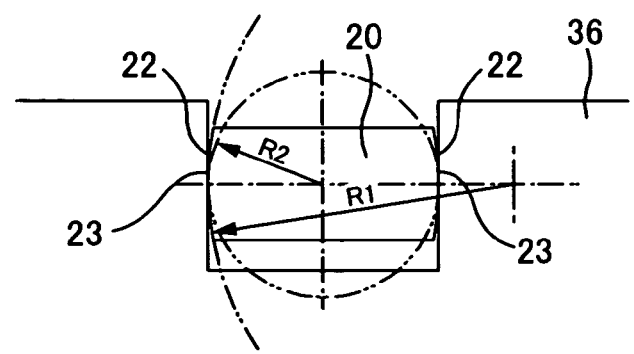
FIG. 9 is an explanatory diagram showing the relationship between a radius of an inscribed circle of an engaged section and a radius of curvature of a curved surface of an engaging section.

FIGS. 1 through 9 illustrate one embodiment of a motor-fastening mechanism according to the present invention. FIG. 1 is a front view showing the overall configuration, FIG. 2 is a left side view of FIG. 1, FIG. 3 is a cross-sectional view along section A-A of FIG. 1, FIG. 4 is a magnified cross-sectional view of a part of FIG. 3, FIG. 5 is a cross-sectional view along section B-B of FIG. 4, FIG. 6 is a magnified cross-sectional view showing another example of a fastening section, FIG. 7 is a view on arrow C of FIG. 2, FIG. 8 is a view on arrow D of FIG. 2, and FIG. 9 is an explanatory diagram showing the relationship between a radius of an inscribed circle of an engaged section and a radius of curvature of a curved surface of an engaging section.

A motor-fastening mechanism 1 of this embodiment is an effective measure for fastening to an input shaft of a driven member an output shaft of a motor which rotates with high precision such as a servo motor. As shown in FIGS. 1 through 3, the motor-fastening mechanism 1 has a fastening section 6 which fastens an output shaft 4 of a motor 2 and an input shaft 13 of a driven member 11 to each other, a motor-attachment member 36 which is attached to the motor 2, an engaged section 37 provided in the motor-attachment member 36, and an engaging section 20 provided on a housing 12 of the driven member 11.

The motor-attachment member 36 has a rectangular-plate shape. The motor-attachment member 36 is furnished with a through hole 38 which penetrates this motor-attachment member 36 between a front surface and a back surface thereof and is located in the central section near one end in a longitudinal direction. The motor-attachment member 36 is also furnished with an engaging recess 37 which serves as an engaged section having a predetermined width and depth and is located in the central section near the other end in the longitudinal direction. The motor 2 is attached to the motor-attachment member 36 on the front surface side thereof such that the through hole 38 in the central section near the one end is closed thereby.

The motor 2 has a motor main body 3 and the output shaft 4 which extends outwardly from the motor main body 3. Inserting the output shaft 4 into the through hole 38 of the motor-attachment member 36 and fixing the motor main body 3 with bolts 5 on the periphery of the through hole 38 of the motor-attachment member 36 fixes the motor 2 on the front surface side of the motor-attachment member 36.

The input shaft 13 of the driven member 11 is inserted into the through hole 38 of the motor-attachment member 36 from the back surface side of the motor-attachment member 36. This input shaft 13 and the output shaft 4 of the motor 2 are fastened to each other and are firmly combined coaxially by the fastening section 6. As a result thereof, the input shaft 13 and the output shaft 4 are constructed relatively immovably in the vertical direction and in the horizontal direction.

As shown in FIGS. 4 and 5, the fastening section 6 is structured as follows: a fitting hole 14 having a predetermined inside diameter and depth is provided in an extremity of the input shaft 13 of the driven member 11; the output shaft 4 of the motor 2 is fitted into this fitting hole 14; the two halves of a fastening member 16 are fitted onto the exterior of the input shaft 13; and the two halves of the fastening member 16 are fastened together with bolts 17, thereby compressing a thin-wall section 15 of the input shaft 13, which is cylindrical in shape. As a result thereof, the fastening section 6 frictionally fastens the input shaft 13 and the output shaft 4 to each other firmly. Also, as shown in FIG. 6, it is possible to structure the fastening section 6 such that the output shaft 4 of the motor 2 is frictionally fastened by fitting the output shaft 4 with shrink fitting, etc. into the fitting hole 14 which has a predetermined inside diameter and depth and is provided in the extremity of the input shaft 13 of the driven member 11. The fastening section 6 is not limited thereto, and it is only necessary that the fastening section 6 can fasten the output shaft 4 and the input shaft 13 to each other relatively immovably. The fastening section 6 mentioned above can suppress occurrence of a runout error and is suitable for positioning with high responsivity, high speed and high precision.

As shown in FIGS. 1 through 3, the engaging recess 37 of the motor-attachment member 36 has a rectangular shape; a bottom surface 39 thereof being a flat surface extending in the horizontal direction and both side surfaces 40, 40 thereof being a flat surface extending in the vertical direction perpendicular to the bottom surface 39. A fixing member 20 on the side of the driven member 11, which serves as an engaging section, is engaged to the engaging recess 37.

The fixing member 20 is provided on the housing 12 of the driven member 11 as a part thereof and is engaged in the engaging recess 37 of the motor-attachment member 36 relatively movably in only a predetermined direction. Relative displacement of the fixing member 20 enables to absorb misalignment which occurs on the fastened portion where the output shaft 4 of the motor 2 and the input shaft 13 of the driven member 11 are fastened together.

Figure 10:
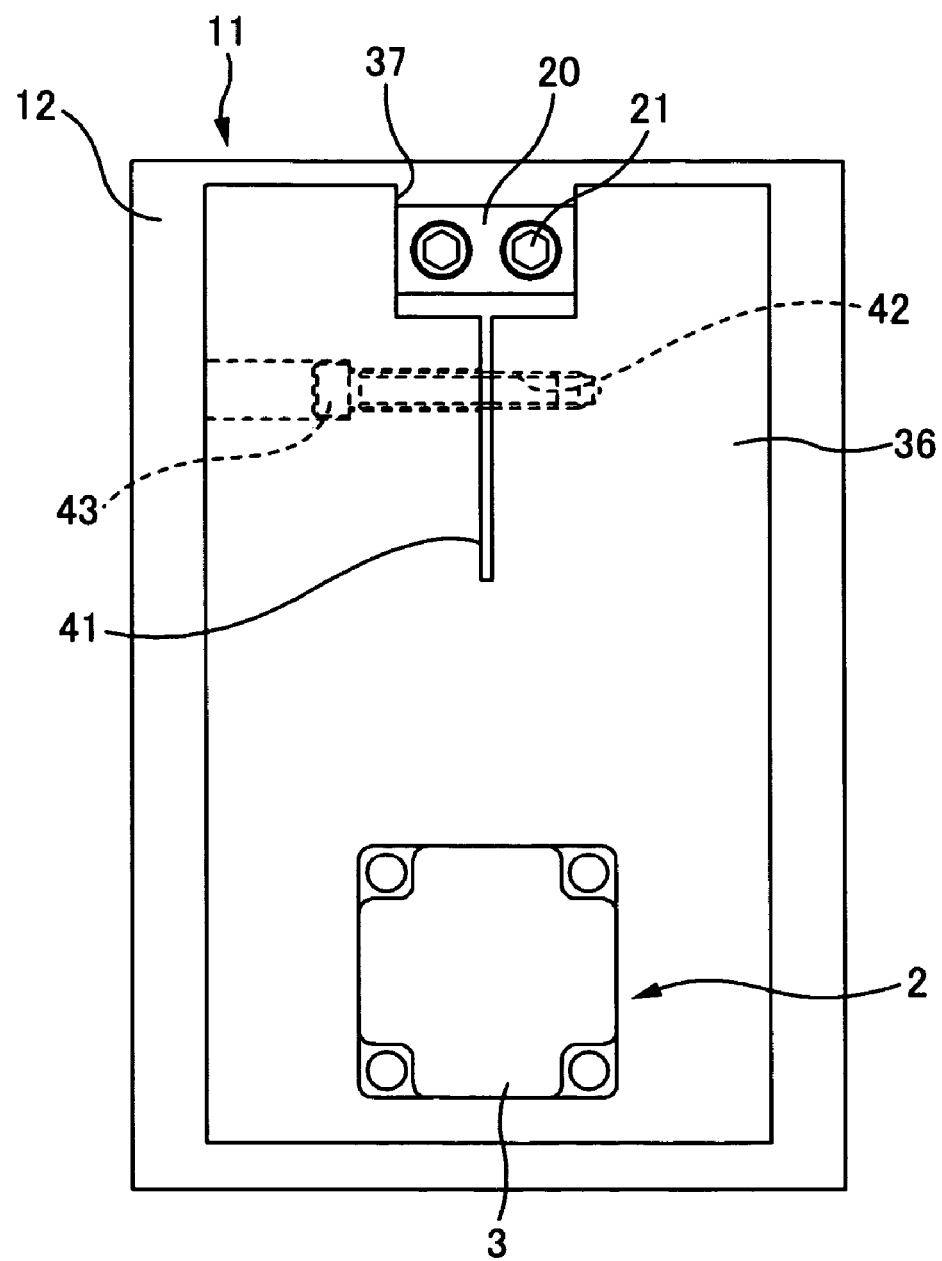
FIG. 10 is a front view of a modified example of an engaging section and an engaging recess.
Figure 11:
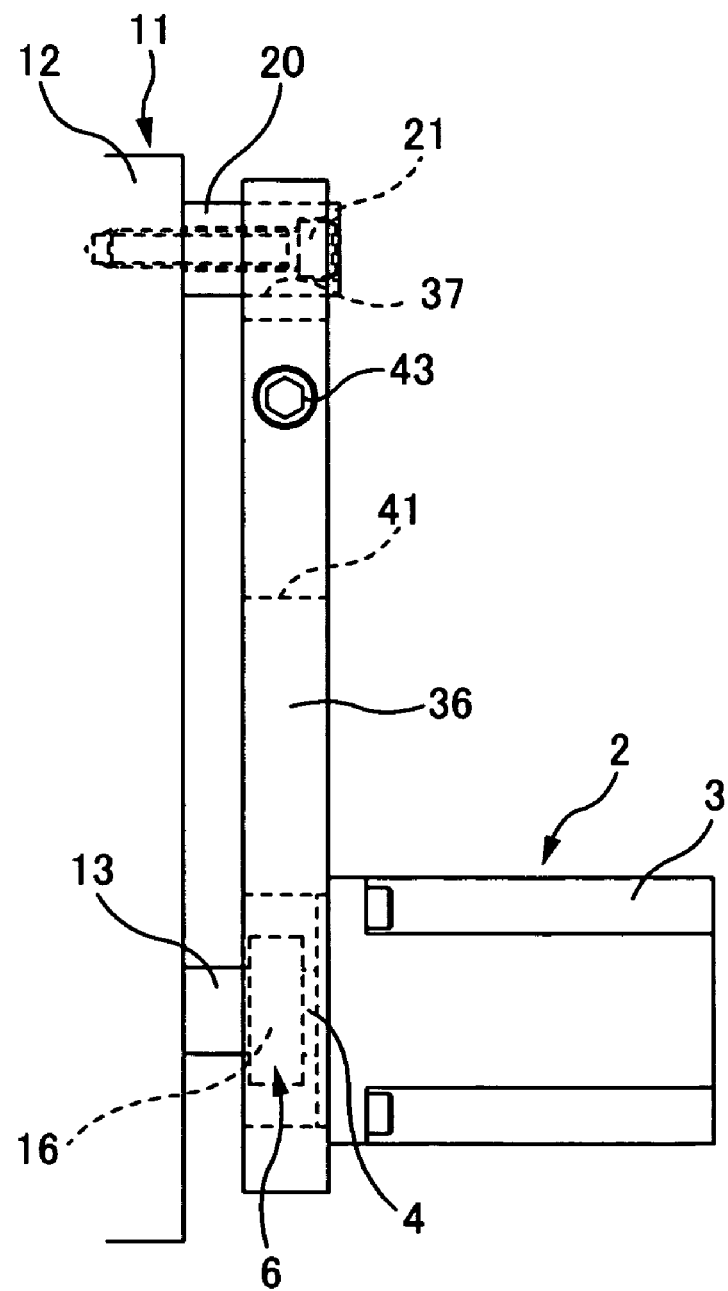
FIG. 11 is a side view of FIG. 10.

The fixing member 20 has an approximately rectangular-parallelepiped shape. The fixing member 20 can be formed as a part of the housing 12 of the driven member 11 as shown in FIGS. 1 through 3, or can be formed separately from the housing 12 of the driven member 11 and be fixed on the housing 12 as a part thereof with bolts 21 as shown in FIGS. 10 and 11.

As shown in FIG. 7, side surfaces 22, 22 of the fixing member 20 are located opposite each of the side surfaces 40, 40 of the engaging recess 37 respectively and are each formed into a curved surface 23 having a predetermined radius of curvature and extend in the vertical direction (a direction perpendicular to an axis of the output shaft 4 of the motor 2). Further, as shown in FIG. 8, each of the side surfaces 22, 22 is formed into a curved surface 24 having the predetermined radius of curvature and extends in the front-to-rear direction (a direction along an axis of the output shaft 4 of the motor 2).

More specifically, as shown in FIG. 9, both of the side surfaces 22, 22 of the fixing member 20 are formed such that the side surfaces 22, 22 are formed into the curved surfaces 23 in the vertical direction and the curved surfaces 24 in the front-to-rear direction, the curved surfaces having a radius of curvature R1 which is determined depending on an amount of misalignment which occurs on the fastened portion where the output shaft 4 of the motor 2 and the input shaft 13 of the driven member 11 are fastened together. In this case, when the radius of curvature of the curved surface 23 and the curved surface 24 is defined as R1 and a radius of curvature of a circle inscribed in the engaging recess 37 is defined as R2, the radius of curvature R1 of the curved surfaces 23 and 24 of the fixing member 20 is set such that the relationship R1>>R2 is satisfied.

Thus, if both of the side surfaces 22, 22 of the fixing member 20 are formed into the curved surfaces 23 and the curved surfaces 24 having the predetermined radius of curvature R1 as mentioned above, misalignment occurring on the fastened portion where the output shaft 4 of the motor 2 and the input shaft 13 of the driven member 11 are fastened together is absorbed since the fixing member 20 on the side of the housing 12 is displaced relatively in a direction indicated by the arrow in FIG. 7 (a tangential direction of the curved surface 23) and in a direction indicated by the arrow in FIG. 8 (a tangential direction of the curved surface 24) within the engaging recess 37 of the motor-attachment member 36.

In other words, by co-operation of the engaging recess 37 of the motor-attachment member 36 and the fixing member 20 of the housing 12 of the driven member 11, it becomes possible to constrain displacement of the motor main body 3 with respect to a rotating direction of the output shaft 4, that is, a normal direction on a contact point of the engaging recess 37 and the fixing member 20, and it also becomes possible to allow displacement (whirling) with respect to a tangential direction on the contact point. As a result thereof, whirling of the motor main body 3 can be allowed concurrently with running against reaction force associated with rotation of the output shaft 4 of the motor 2. Accordingly, it becomes possible to obtain high transfer stiffness because deformation caused by stress can be reduced remarkably when verification is made regarding contact stress, for example.

Further, it is possible to obtain a function of transferring rotation without backlash and with high rigidity and small lost motion such as a runout error because misalignment can be absorbed under a condition in which high transfer stiffness is maintained. Note that a clearance can be provided depending on misalignment between each of the side surfaces 22, 22 of the fixing member 20 and each of the side surfaces 40, 40 of the engaging recess 37.

Figure 12:
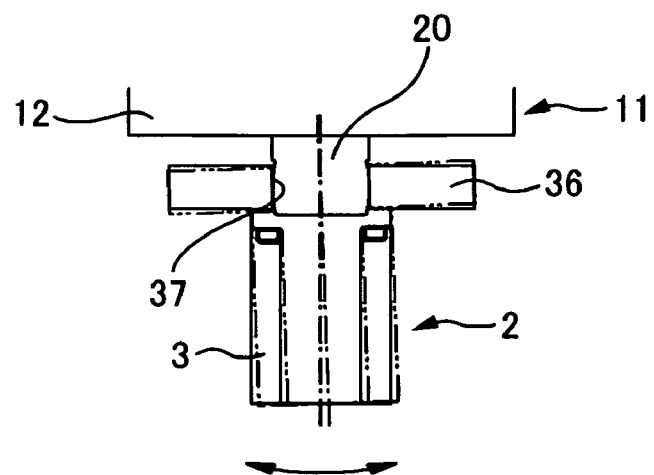
FIG. 12 is an explanatory diagram showing a state in which misalignment is absorbed.
Figure 13:
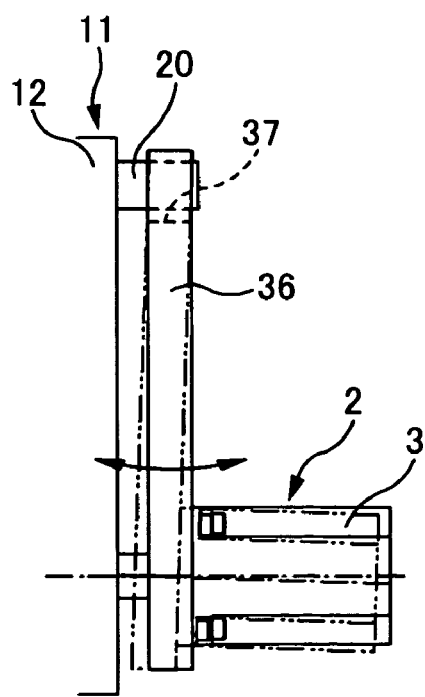
FIG. 13 is an explanatory diagram showing a state in which misalignment is absorbed.
Figure 14:
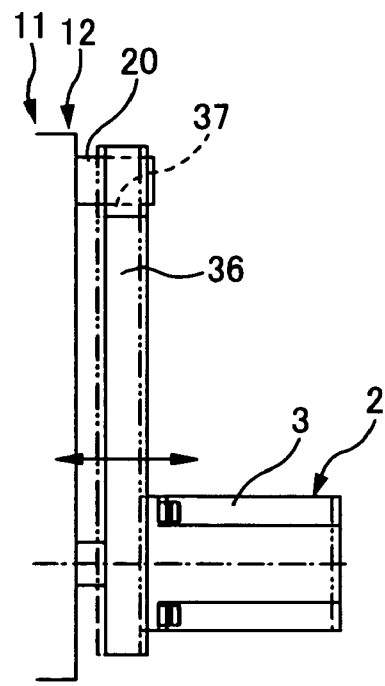
FIG. 14 is an explanatory diagram showing a state in which misalignment is absorbed.
Figure 15:
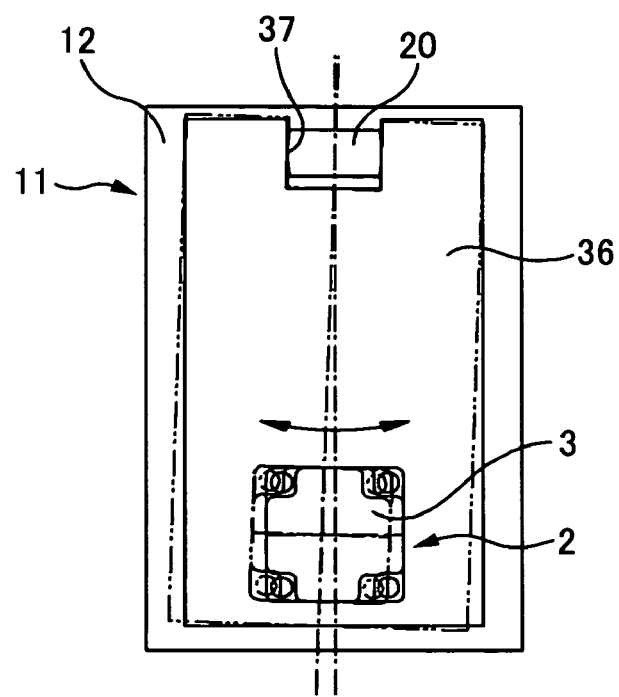
FIG. 15 is an explanatory diagram showing a state in which misalignment is absorbed.
Figure 16:
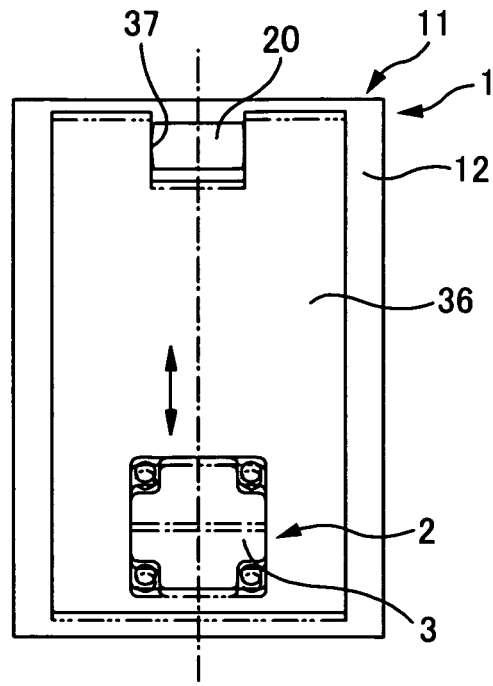
FIG. 16 is an explanatory diagram showing a state in which misalignment is absorbed.

FIGS. 12 through 16 show states in which misalignment is absorbed. FIGS. 12, 13 and 15 show states in which an angle error between the output shaft 4 and the input shaft 13 is absorbed. FIG. 14 shows a state in which an axial error of the output shaft 4 and the input shaft 13 is absorbed. FIG. 16 shows a state in which a parallel error of the output shaft 4 and the input shaft 13 is absorbed. Relative displacement of the motor-attachment member 36 with respect to the housing 12 in these ways enables to absorb misalignment (the angle error, the axial error, and the parallel error) which occurs on the fastened portion where the output shaft 4 and the input shaft 13 are fastened together.

Note that, as shown in FIGS. 10 and 11, a configuration is also acceptable in which a slit 41 having a predetermined width is provided in a bottom surface 39 of the engaging recess 37 of the motor-attachment member 36, an adjuster bolt 43 is screwed into a screw hole 42 penetrating the slit 41 from the side of a side surface of the motor-attachment member 36, the width of the slit 41 is adjusted depending on a screwing amount of the adjuster bolt 43, and a contact force between the fixing member 20 and the engaging recess 37 is adjusted. In this case, adjustment of the contact force enables to provide a clearance depending on misalignment between the fixing member 20 and the engaging recess 37.

Figure 17:
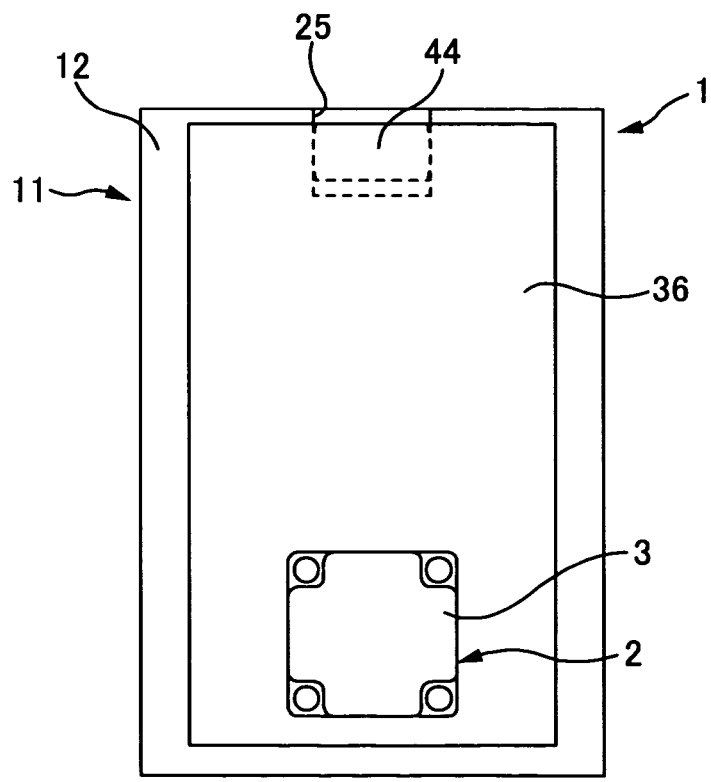
FIG. 17 is a front view showing a second embodiment of a motor-fastening mechanism according to the present invention.
Figure 18:
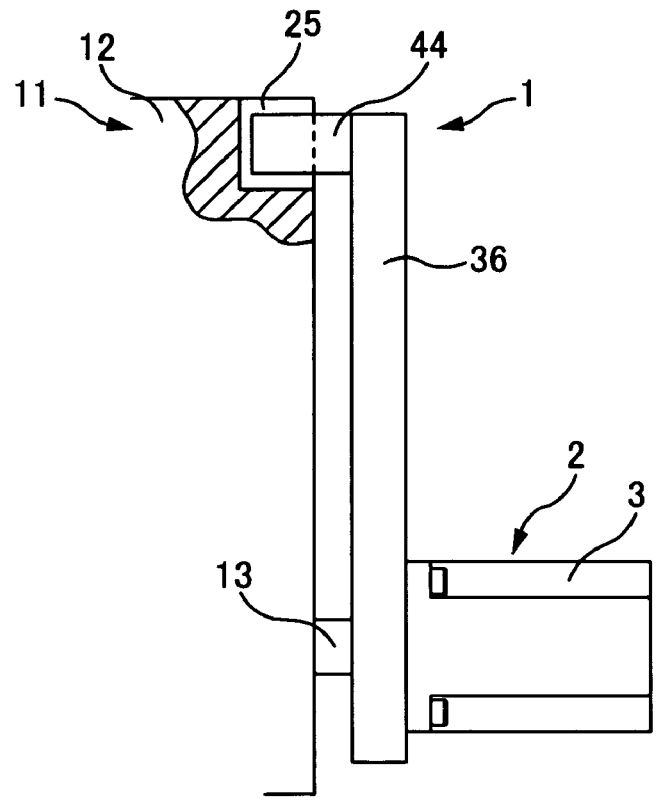
FIG. 18 is a side view of FIG. 17.
Figure 19:
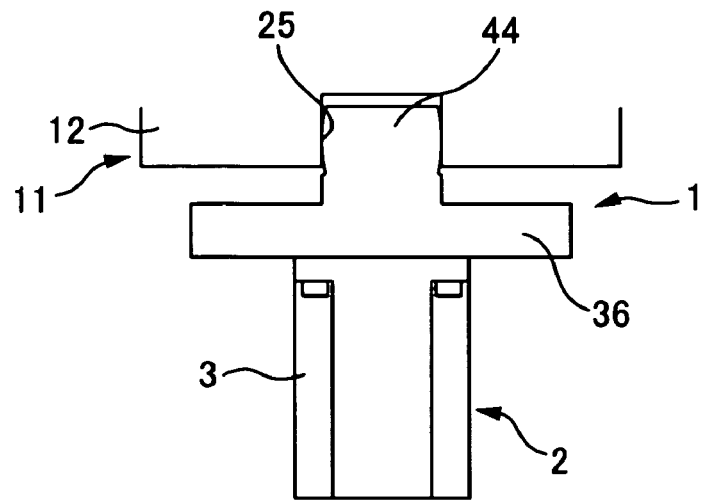
FIG. 19 is a plan view of FIG. 17.

FIGS. 17 through 19 illustrate the second embodiment of a motor-fastening mechanism according to the present invention. This motor-fastening mechanism 1 is furnished with a fixing member 44, which serves as an engaging section, on the side of the motor-attachment member 36, and is also furnished with an engaging recess 25, which serves as an engaged section, on the side of the housing 12 of the driven member 11. The remaining part of the motor-fastening mechanism 1 in the second embodiment is configured in the same way as illustrated in the first embodiment.

In this case, the fixing member 44 can be formed as a part of the motor-attachment member 36 as shown in FIGS. 18 and 19, or also can be formed separately from the motor-attachment member 36 and be constructed such that it is fixed on the motor-attachment member 36 with a bolt (not shown).

In the same way as illustrated in the first embodiment, the motor-fastening mechanism 1 illustrated in this embodiment enables to obtain a function of transferring rotation without backlash and with high rigidity and small lost motion such as a runout error because the motor-fastening mechanism 1 can absorb misalignment under a condition in which high transfer stiffness is maintained.

Figure 20:
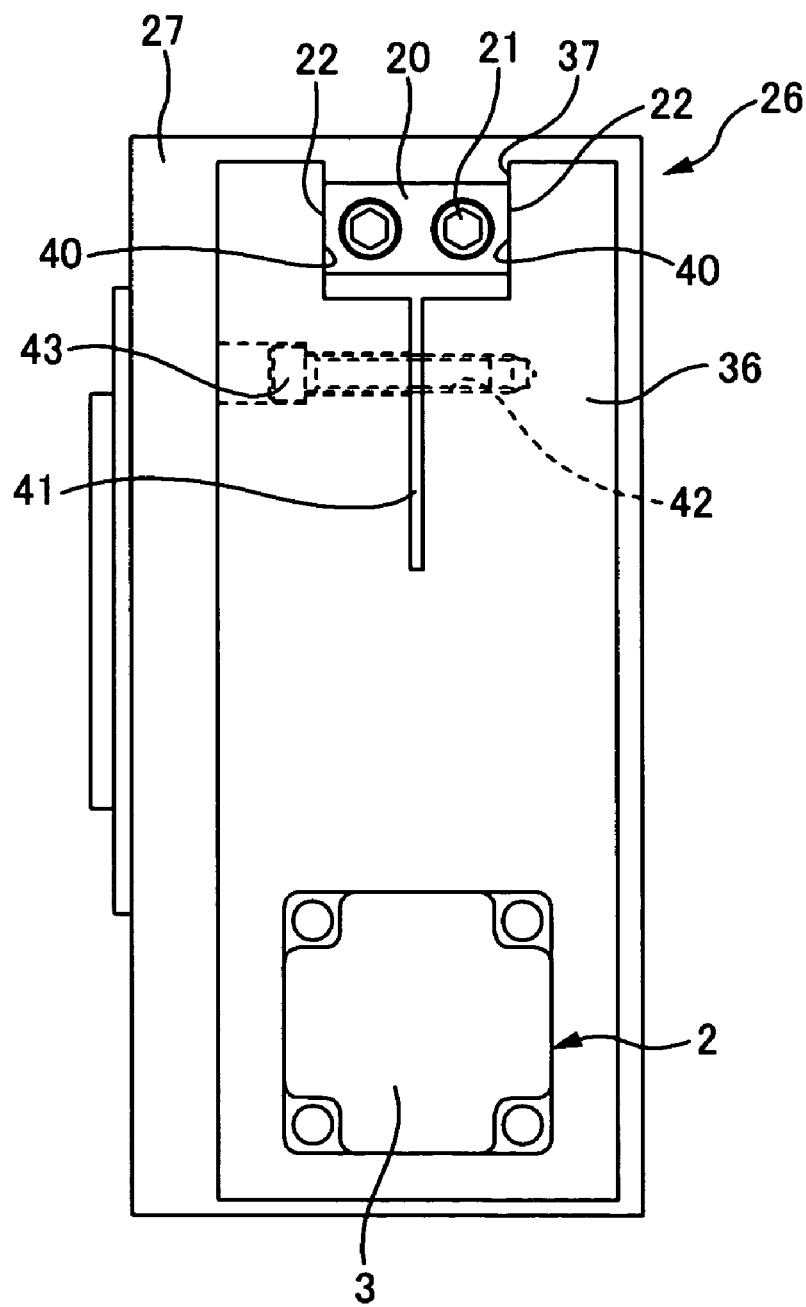
FIG. 20 is a front view showing one embodiment of a cam device according to the present invention.
Figure 21:
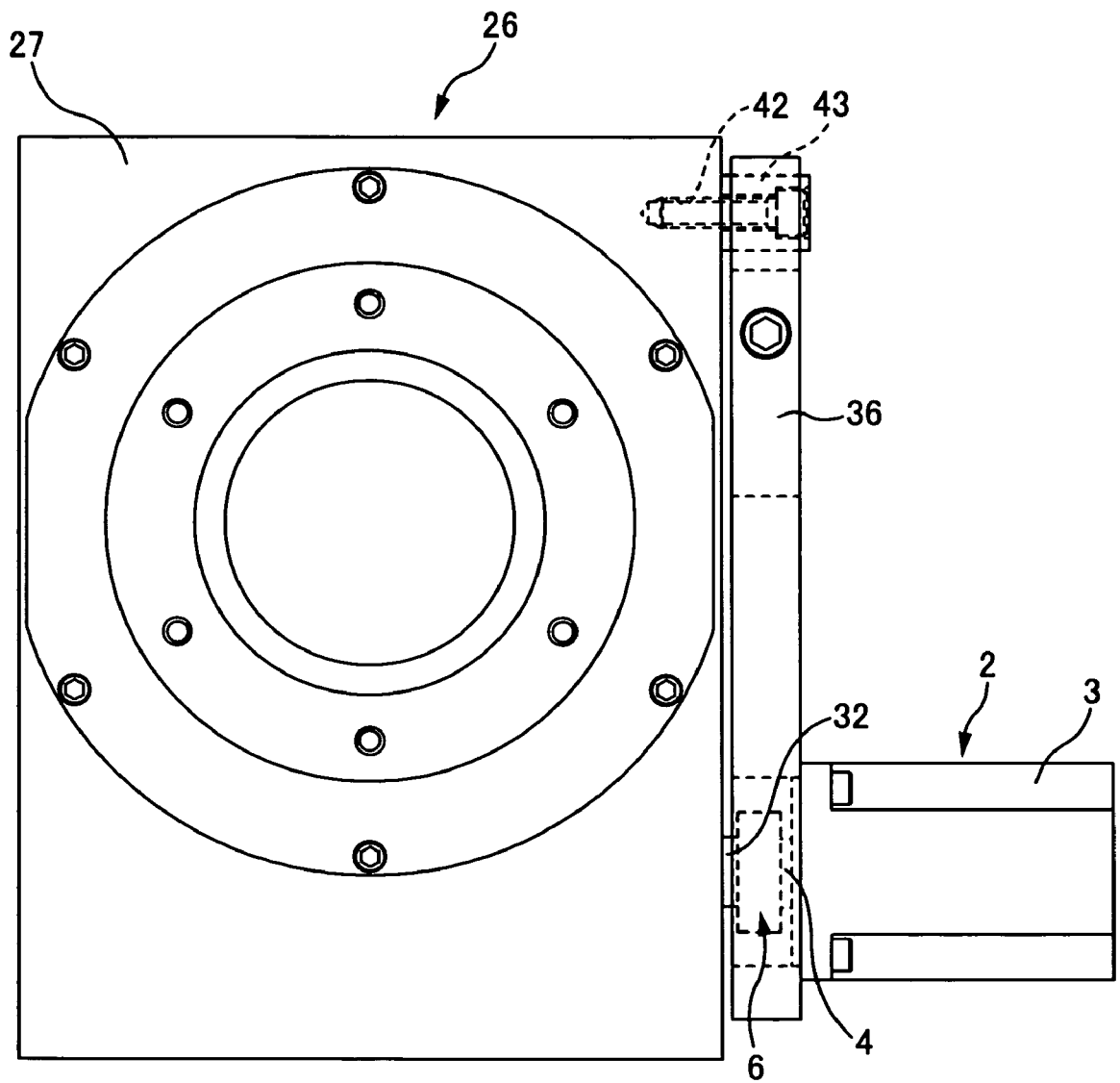
FIG. 21 is a side view of FIG. 20.
Figure 22:
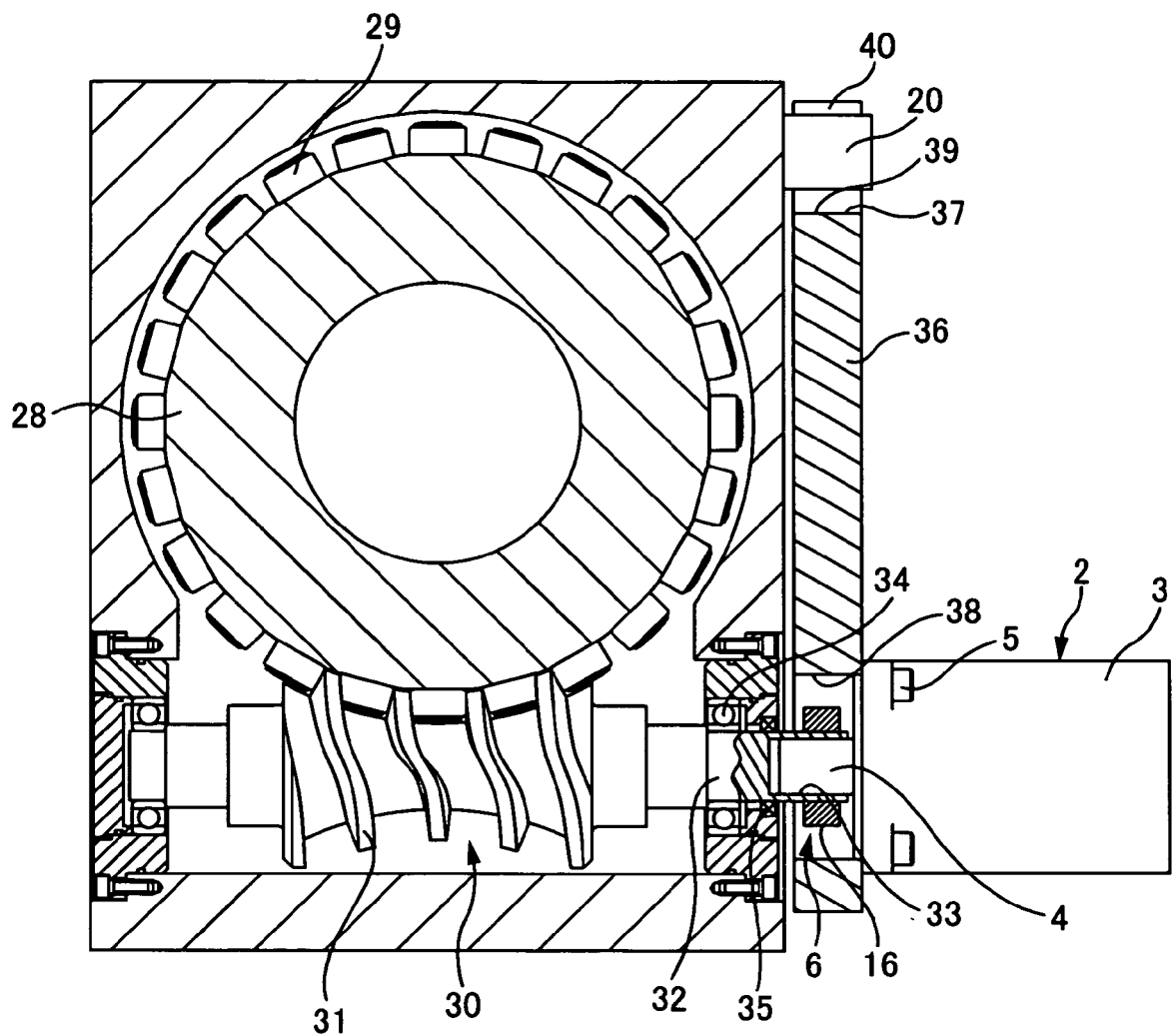
FIG. 22 is a vertical cross-sectional view of FIG. 20.

FIGS. 20 through 22 illustrate one embodiment of a cam device according to the present invention, and this cam device 26 is an example in which the motor-fastening mechanism 1 of the first embodiment is applied in order to fasten the output shaft 4 of the motor 2 and an input shaft 32 of the cam device 26.

The cam device 26 has a housing 27, a turret 28 provided rotatably within the housing 27, a roller gear cam 30 which is provided rotatably within the housing 27 and has a cam 31 meshing mutually with cam followers 29 of the turret 28, bearings 34, 34 by which the roller gear cam 30 is supported rotatably, and a sealing member 35 which seals a part between the roller gear cam 30 and the housing 27. A fitting hole 33 is provided in the extremity of the input shaft 32 of the roller gear cam 30 in the same way as the first embodiment.

In the cam device 26 configured as mentioned above, the output shaft 4 of the motor 2 is fitted into the fitting hole 33 of the input shaft 32 of the roller gear cam 30 and then the fastening member 16 is fastened by being fitted to the exterior of the input shaft 32. In this way, the input shaft 32 and the output shaft 4 are fastened to each other and are firmly combined coaxially. The fixing member 20 which is provided on the side of the housing 27 of the cam device 26 is engaged to the engaging recess 37 of the motor-attachment member 36 which is attached to the motor 2.

Accordingly, attaching the motor 2 to the cam device 26 makes the roller gear cam 30 of cam device 26 rotate following rotation of the output shaft 4 of the motor 2, and then makes the turret 28 rotate following rotation of the roller gear cam 30.

Since the cam device 26 of this embodiment configured as mentioned above is furnished with the motor-fastening mechanism 1 illustrated in the first embodiment, it becomes possible to absorb misalignment under a condition in which high transfer stiffness is maintained and also possible to obtain a function of transferring rotation without backlash and with high rigidity and small lost motion such as a runout error. Further, it becomes possible to minimize occurrence of an error at an endmost output end with respect to output of the motor 2, to provide excellent responsivity, and to achieve positioning by the cam device 26 at high speed with high precision.

The configuration of the cam device 26 of this embodiment enables to adjust a contact force between the fixing member 20 and the engaging recess 37 by adjusting the width of the slit 41 provided in a bottom surface of the engaging recess 37 of the motor-attachment member 36 by a screwing amount of the adjuster bolt 43.

Though, in the embodiments, both of the side surfaces 22, 22 of the engaging section 20 is formed into the curved surface 23 and the curved surface 24 having the predetermined radius of curvature, both of the side surfaces 40, 40 of the engaged section 37 can have the predetermined radius of curvature. In such case, the same operational effects can be achieved.

Note that the engaging section described in the embodiments can be constructed of an elastic member which is elastically deformable depending on misalignment, that is, a member which is made from polymeric material, etc. and has rigidity and remarkably small elasticity, for example.

What is claimed is:

1. A motor-fastening mechanism for fastening an output shaft of a motor and an input shaft of a driven member to each other, comprising:
    a fastening section that fastens the output shaft of the motor and the input shaft of the driven member relatively immovably;
    a motor-attachment member that is attached to the motor;
    an engaged section that is provided on either one of the motor-attachment member and the driven member; and
    an engaging section that is provided on the other of the motor-attachment member and the driven member and that is engaged to the engaged section such that displacement of the output shaft in a rotating direction thereof is regulated;
    wherein either one of a contact surface of the engaging section that is in contact with the engaged section and a contact surface of the engaged section that is in contact with the engaging section is formed into a curved surface having a radius of curvature that depends on misalignment occurring on a fastened portion where the output shaft of the motor and the input shaft of the driven member are fastened to each other; and
    the other of the contact surface of the engaging section that is in contact with the engaged section and the contact surface of the engaged section that is in contact with the engaging section is formed as a flat surface.

2. A motor-fastening mechanism according to claim 1, wherein:
    the one of either the contact surface of the engaging section that is in contact with the engaged section and the contact surface of the engaged section that is in contact with the engaging section that is to be formed into a curved surface is formed such that the curved surface has a radius of curvature that depends on the misalignment and is curved in a direction along an axis of the output shaft of the motor and in a direction perpendicular to the axis.

3. A motor-fastening mechanism according to claim 1, wherein:
    when a radius of curvature of the curved surface of the engaging section is defined as R1 and a radius of curvature of a circle inscribed in the engaged section is defined as R2, a radius of curvature of the curved surface of either of the engaging section and the engaged section is set such that the relationship R1>>R2 is satisfied.

4. A motor-fastening mechanism according to claim 1, wherein:
    a clearance is provided between the engaging section and the engaged section, the clearance depending on misalignment occurring on a fastened portion where the output shaft of the motor and the input shaft of the driven member are fastened to each other.

5. A motor-fastening mechanism according to claim 1, wherein:
    the engaging section is constructed of an elastic member that is elastically deformable depending on misalignment occurring on a fastened portion where the output shaft of the motor and the input shaft of the driven member are fastened to each other.

6. A motor-fastening mechanism according to claim 1, wherein:
    the input shaft and the output shaft are fastened to each other by frictionally fastening the output shaft of the motor and a fitting hole that is provided coaxially with the output shaft of the motor in an end section of the input shaft, the frictional fastening being achieved by fitting the output shaft of the motor into the fitting hole.

7. A cam device comprising:
    a housing;
    a turret provided rotatably within the housing;
    a roller gear cam that is provided rotatably within the housing and that meshes with the turret mutually; and
    a motor whose output shaft is fastened to an input shaft of the roller gear cam by a motor-fastening mechanism, the motor-fastening mechanism having a fastening section that fastens the output shaft of the motor and the input shaft of the roller gear cam relatively immovably, a motor-attachment member that is attached to the motor, an engaged section that is provided on either one of the motor-attachment member and the housing, and an engaging section that is provided on the other of the motor-attachment member and the housing and that is engaged to the engaged section such that displacement of the output shaft in a rotating direction thereof is regulated;

wherein either one of a contact surface of the engaging section that is in contact with the engaged section and a contact surface of the engaged section that is in contact with the engaging section is formed into a curved surface having a radius of curvature that depends on misalignment occurring on a fastened portion where the output shaft of the motor and the input shaft of the roller gear cam are fastened to each other; and the other of the contact surface of the engaging section that is in contact with the engaged section and the contact surface of the engaged section that is in contact with the engaging section is formed as a flat surface.

* * * * *

UNITED STATES PATENT AND TRADEMARK OFFICE
CERTIFICATE OF CORRECTION

PATENT NO. : 7,649,287 B2　　　　　　　　　　　　　　　　　　　　　　Page 1 of 1
APPLICATION NO. : 11/520309
DATED : January 19, 2010
INVENTOR(S) : Kato et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 659 days.

Signed and Sealed this

Twenty-third Day of November, 2010

David J. Kappos
*Director of the United States Patent and Trademark Office*